B. TITUS.
BROOM CORN BOOTER.
APPLICATION FILED JAN. 3, 1912.

1,036,030.

Patented Aug. 20, 1912.

3 SHEETS—SHEET 1.

Witnesses

Inventor
Benjamin Titus
By
his Attorney

B. TITUS.
BROOM CORN BOOTER.
APPLICATION FILED JAN. 3, 1912.

1,036,030.

Patented Aug. 20, 1912.
3 SHEETS—SHEET 2.

Witnesses

Inventor
Benjamin Titus.

By
his Attorney

B. TITUS.
BROOM CORN BOOTER.
APPLICATION FILED JAN. 3, 1912.

1,036,030.

Patented Aug. 20, 1912.
3 SHEETS—SHEET 3.

Witnesses

Inventor
Benjamin Titus

By
his Attorney

UNITED STATES PATENT OFFICE.

BENJAMIN TITUS, OF WELLVILLE, VIRGINIA.

BROOM-CORN BOOTER.

1,036,030.     Specification of Letters Patent.     Patented Aug. 20, 1912.

Application filed January 3, 1912. Serial No. 669,195.

*To all whom it may concern:*

Be it known that I, BENJAMIN TITUS, a citizen of the United States, residing at Wellville, in the county of Nottoway and State of Virginia, have invented certain new and useful Improvements in Broom-Corn Booters, of which the following is a specification.

The present invention relates to a novel machine for threshing broom corn and preparing it for use.

As broom corn grows there is a small leaf or sheath known as the boot at the base of each tassel. At the present time the ordinary method of removing this boot is by hand, and this is a very slow and tedious process where a large amount of broom corn is to be prepared for use.

One of the objects of the present invention has accordingly been to provide a machine which embodies novel features of construction whereby these boots are automatically removed from the tassels as they pass through the machine.

A further object of the invention has been to provide a machine which will operate automatically to cut of the stalk close to the boot, to strip the boot from the tassel, and to remove the seeds from the tassel, thereby leaving the tassel in condition for use when it emerges from the machine.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1:
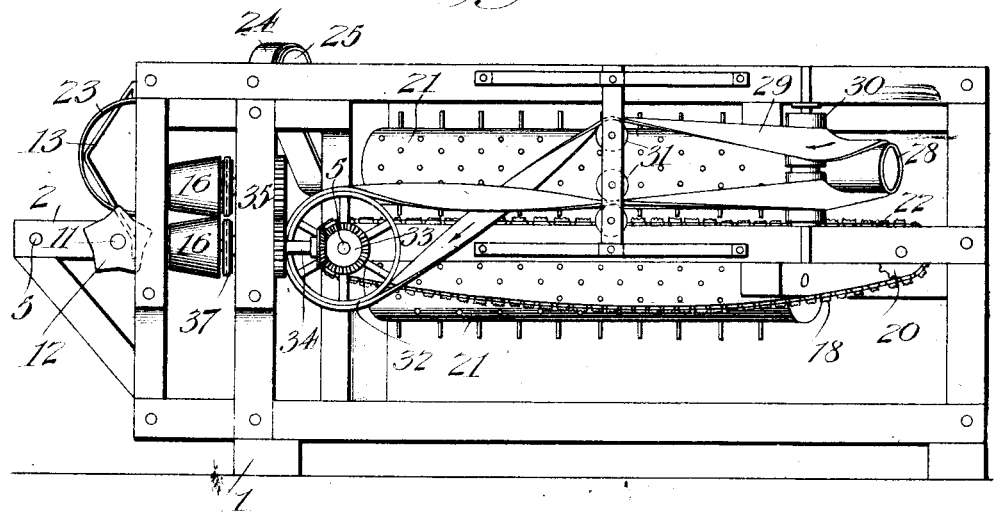
Figure 2:
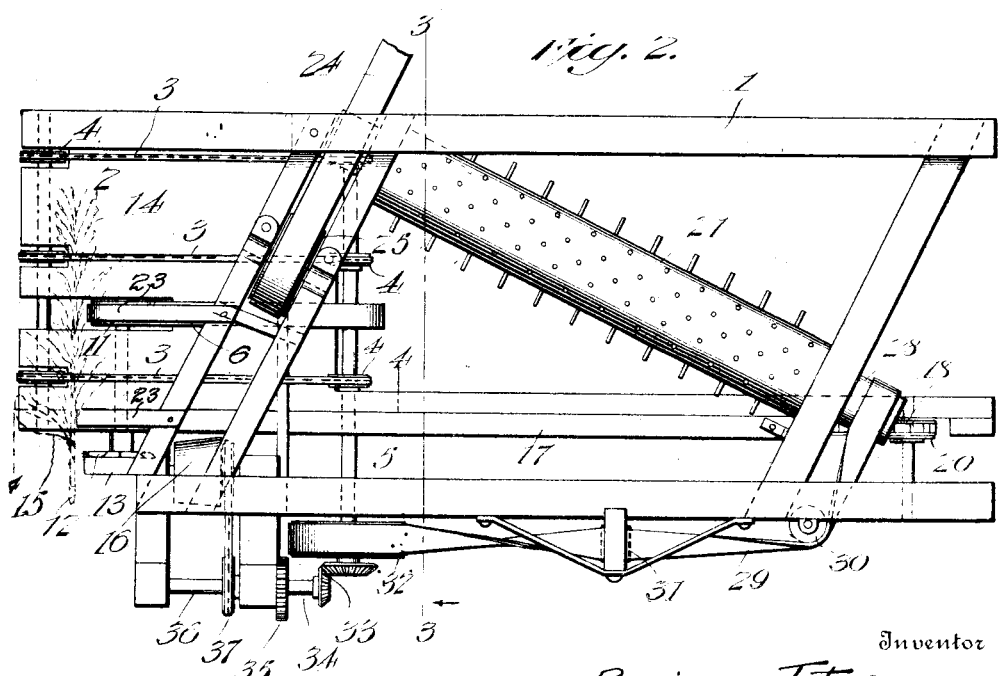
Figure 3:
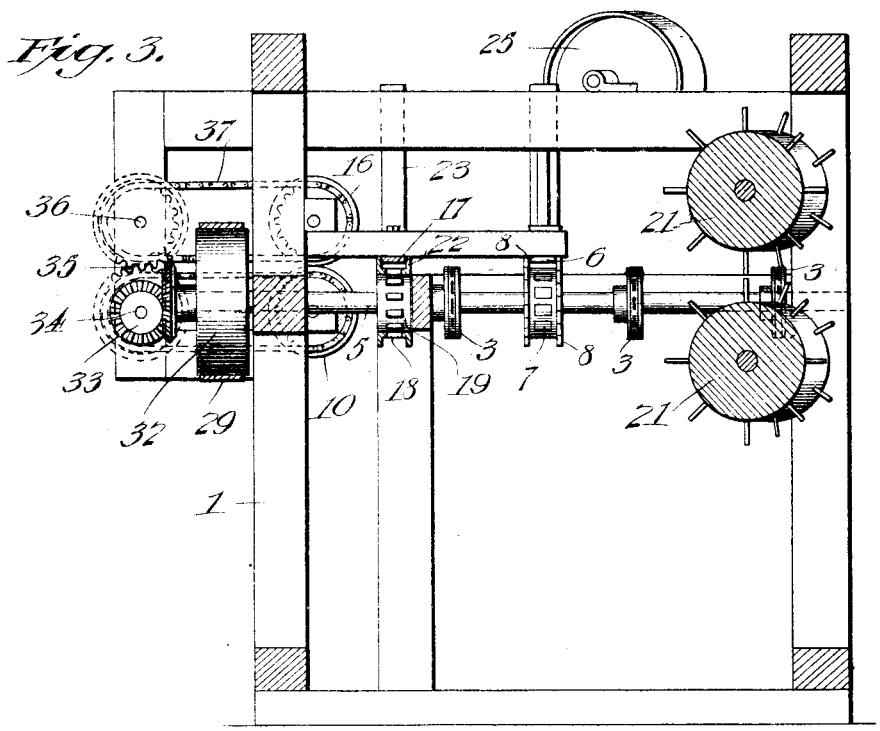
Figure 4:
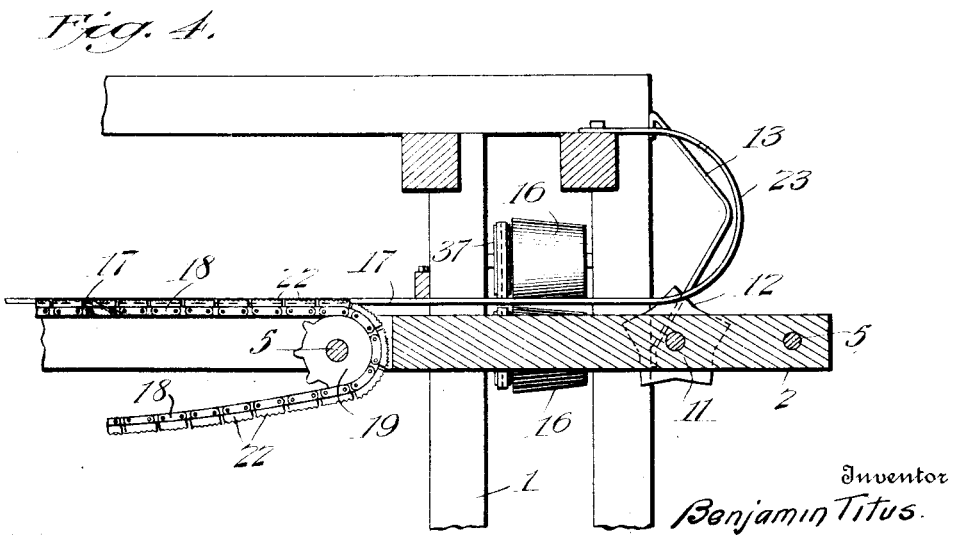
Figure 5:
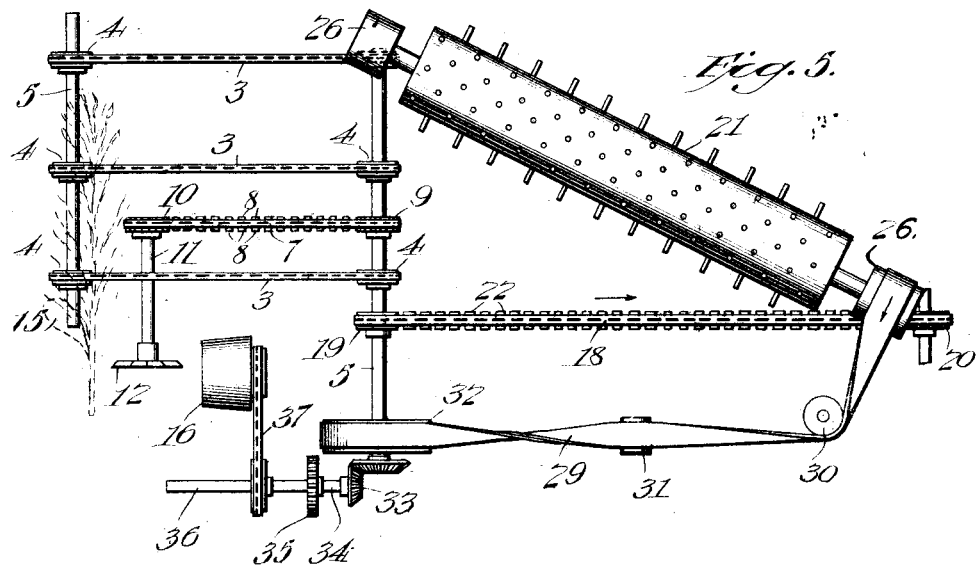
Figure 6:
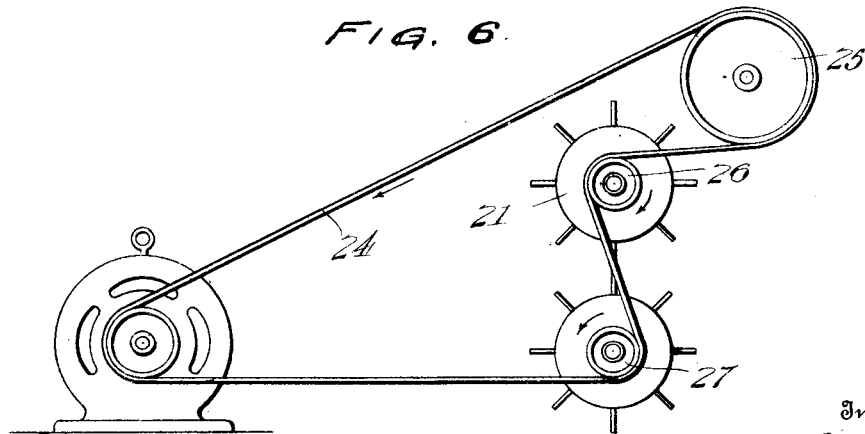

Figure 1 is a side elevation of a broom corn threshing machine constructed in accordance with the invention. Fig. 2 is a top plan view of the same. Fig. 3 is a transverse sectional view on the line 3—3 of Fig. 2. Fig. 4 is an enlarged longitudinal sectional view through the forward end of the machine on the line 4—4 of Fig. 2. Fig. 5 is a diagrammatic top plan view showing the relative positions of the various parts, and Fig. 6 is a detail view showing the manner of applying power to the machine.

Corresponding and like parts are referred to in the following description and indicated in all the views of the drawings by the same reference characters.

Specifically describing the present embodiment of the invention, the numeral 1 designates the supporting frame upon which the threshing mechanism is mounted. A table 2 is formed at one end of the supporting frame, the tassels of corn being placed upon this table as they are fed to the machine. The upper reaches of a series of belts or chains 3 pass over the top of the table and are driven in such a direction as to feed the broom corn to the cutting, stripping, and threshing mechanism. These chains 3 pass around sprockets 4 upon a pair of transverse shafts 5 which are suitably journaled upon the frame. In its initial movement upon the table 2 by the chains 3, the corn is brought between a spring actuated presser bar 6 and a toothed chain or belt 7, the said presser bar and toothed chain serving to positively grip the corn and hold it firmly in proper position as it is moved over the table. In the present instance, the teeth 8 of the chain or belt 7 project upwardly on opposite sides of the bar 6, as indicated more clearly in Fig. 3, the said chain passing around a sprocket 9 upon the rear shaft 5, and also around a sprocket 10 upon a transverse shaft 11 which is suitably journaled upon the frame and is provided at the end thereof with a rotary cutter 12. A bracket 13 projects from the supporting frame 1 in coöperative relation to the cutter 12 and serves to direct the stalks of the broom corn into engagement with the cutter so that they are severed thereby. In this connection, it may be noted that, as indicated more clearly by Fig. 2, the broom corn is placed upon the table 2 in such a manner that as it is advanced to the cutter 12, the stalk of the corn will be severed close to the boot 15. After the corn has been operated upon by the cutter 12, it is advanced over the table until the severed end thereof is brought into engagement with the stripping rolls 16. These stripping rolls revolve in opposite directions and coöperate with each other to grip the boot 15 and pull it longitudinally from the rear end of the tassel. It will be observed that the stripping rolls are substantially frusto-conical in shape and that the reduced ends thereof diverge from each other toward the feed end of the machine to provide a mouth for the entrance of the booted end of the tassel.
At the rear end of the table 2, the broom corn passes between a second presser bar 17 and second toothed belt or chain 18, the said toothed chain passing around a sprocket 19 upon the rear shaft 5, and also around a sprocket 20 at the rear of the machine. This toothed chain is offset laterally toward one side of the machine so as to grip the corn tassels at the extreme end thereof from which the boot has just been stripped. Upon the continued movement of the tassels, they are brought between the toothed threshing rolls 21 which revolve in opposite directions and operate to remove the seed and like from the fibers of the tassels so as to prepare the tassels for use. These threshing rolls are inclined with respect to the path of the broom corn and are arranged so as to act first upon the ends of the tassels and gradually work in toward the bases of the tassels. After passing between the threshing rolls, the broom corn is discharged from the machine in condition for use.

It will be observed that the teeth 22 of the chain or belt 18 project upwardly on opposite sides of the presser bar 17 so as to insure a firm grip upon the corn. It will also be observed that both the presser bar 6 and the presser bar 17 are held yieldingly in position by means of spring strips 23 secured to the supporting frame 1, and that the presser bars are thus enabled to accommodate themselves to varying thicknesses of material which may pass through the machine. The spring strips 23 may be curved, as in the present instance so as to provide guides for directing the corn between the presser bars and the toothed chains. Power is applied to the threshing rolls from any suitable source, and from these threshing rolls it is transmitted to the other moving parts of the machine, Referring to Fig. 6, the numeral 24 designates a drive belt which may be connected to any suitable source of power. The upper portion of the drive belt passes around an idler 25 and is then brought rearwardly and around a pulley 26 upon the upper threshing roll 21. The belt then passes around a similar pulley 27 upon the lower threshing roll 21, the two threshing rolls being thus revolved in opposite directions. At the rear end of the machine, one of the threshing rolls is provided with a pulley 28 which engages an endless belt 29, the said endless belt passing around the guide rolls 30 and 31 and engaging a pulley 32 upon the rear shaft 5. This shaft 5 serves to drive the toothed chains 7 and 18, as well as the rotary cutter 12 which is applied to the shaft 11. The shaft 5 is connected by the bevel gearing 33 to a shaft 34 which is connected by the gearing 35 to a parallel counter shaft 36 arranged above the same. The two shafts 34 and 35 thus revolve in opposite directions and these shafts have chain and sprocket connections 37 with the stripping rolls 16. It will thus be obvious that it is merely necessary to apply power to the threshing rolls, all of the other movable parts of the machine being geared with these rolls so as to be actuated thereby.

In the operation of the device, the broom corn is placed upon the table 2 so as to be carried by the chains 3 into engagement with the presser bar 6 and toothed chain 7. As soon as the corn is thus securely gripped by the presser bar and toothed chain, the stalk is cut off close to the boot by means of the cutter 12. A continued movement of the corn then brings the booted end of the tassel into engagement with the stripping rolls 16 which serve to remove the boot from the tassel. The corn then passes out of engagement with the toothed chain 7 and presser bar 6 and into engagement with a second presser bar 17 and toothed chain 18 which positively grip the end of the corn which has just had the boot removed therefrom. The tassels are then brought into engagement with the threshing rolls which operate upon the same in the usual manner to remove all seed and the like therefrom.

In further explanation of the invention embodied in the structure herein described, it should be observed that the present invention provides for a "booting" operation that supplements the action of a specially designed broom-corn harvester forming the subject matter of my related application filed January 3, 1912, Serial No. 669,194. As far as I am aware, no machine has been heretofore devised for removing the "boot" at the base of the tassel end of broom-corn stalks and at the same time threshing out the tassel so as to place the same in proper condition for use in the manufacture of brooms. Consequently, it has not been profitable to harvest standing broom-corn stalks in the field by machinery on account of the necessity for a second handling by hand for the cutting off of the "boot" at the base of the tassel, and the usual practice has been to simply cut by hand the tassel ends from standing broom-corn stalks in the field. Accordingly, the present invention is of very practical importance in connection with a harvesting machine of the kind referred to that will not only cut down broom-corn stalks of any height in the field but at the same time will also provide for cutting off the tassel ends of subsequently uniform lengths with the "boots" attached for subsequent removal by the machine forming the subject matter of the present application.

Having thus described the invention, what I claim as new and desire to secure by Letters Patent, is:—

1. A machine for removing the boots from broom corn, including means for moving the broom corn tassels through the machine, a rotary cutter for severing the stalk close to the boot, and coöperating boot stripping elements engaging the end of the stalk that has been cut, and having means for stripping the boot from the stalk.

2. A machine for removing the boots from broom corn, including coöperating boot stripping rollers, and means for holding the broom corn transversely of the rollers and feeding the same to the stripping rollers, said boot stripping rollers located at one side of said holding and feeding means.

3. A machine for removing the boots from broom corn, including a pair of coöperating frusto-conical stripping rolls arranged with their smaller ends converging from each other to provide a mouth for the entrance of the booted end of the broom corn tassels, and means for holding the broom corn transversely of the rollers and feeding the same to the stripping rollers, said boot stripping rollers located at one side of said holding and feeding means.

4. A machine of the character described, including a conveyer for moving broom corn tassels through the machine, means coöperating with the conveyer to grip the broom corn tassels, a cutter for severing the stalks close to the booted ends of the tassels, and stripping rolls subsequently operating upon the booted ends of the tassels for removing the boots therefrom.

5. A machine of the character described, including a toothed conveyer belt, a presser bar coöperating with the conveyer belt to securely grip the corn tassels, a cutter arranged in the path of the tassels for severing the stalks close to the boot, and stripping rolls arranged in the path of the booted ends of the tassels for subsequently removing the boots therefrom.

6. A machine of the character described, including a conveyer, means coöperating with the conveyer to grip the broom corn tassels and move them through the machine, means for cutting off the stalks and stripping the boots from the tassels, a second conveyer receiving the tassels from the first conveyer, means coöperating with the second conveyer to grip the ends of the tassels from which the boots were previously stripped.

7. A machine of the character described, including a supporting frame, a toothed conveyer, a presser bar coöperating with the toothed conveyer to grip the corn tassels and carry them through the machine, a rotary cutter upon the frame, guide means for bringing the stalk ends of the tassels into engagement with the rotary cutter whereby the stalks are severed close to the boots, and coöperating stripping rolls subsequently receiving the booted ends of the tassels for removing the boots therefrom.

8. A machine of the character described, including a supporting frame, a conveyer thereon, means coöperating with the conveyer to grip broom corn tassels and carry them through the machine, a cutter arranged in the path of the tassels for severing the stalks close to the boots, coöperating stripping rolls arranged in the path of the booted ends of the tassels for stripping the boots therefrom, a second conveyer receiving the tassels from the first conveyer, means coöperating with the second conveyer to grip the ends of the broom corn which was previously acted upon by the boot stripping rolls.

9. A machine of the character described, including a supporting frame, a table portion upon the supporting frame, movable belts upon the table portion, a toothed conveyer also mounted upon the table portion and receiving the broom corn tassels from the moving belts, a presser bar coöperating with the toothed conveyer to grip the broom corn, a cutter arranged in the path of the broom corn for severing the stalk close to the boot, and stripping rolls also arranged in the path of the broom corn for engaging the booted ends of the tassels and removing the boots therefrom.

10. A machine of the character described, including a supporting frame, a pair of transverse shafts upon the supporting frame, endless belts driven by the transverse shafts, a third transverse shaft, a conveyer passing around the third transverse shaft and one of the first mentioned transverse shafts, means coöperating with the conveyer belt to grip the broom corn which is brought thereto by the before mentioned belts, a rotary cutter upon the third transverse shaft for severing the stalks of the tassels close to the boots, a pair of coöperating stripping rolls arranged in the path of the booted ends of the tassels for removing the boots therefrom, gearing between the stripping rolls and one of the transverse shafts, and means for driving the said transverse shaft.

11. A machine of the character described, including a supporting frame, a pair of transverse shafts upon the supporting frame, endless belts passing around the transverse shafts, a third transverse shaft, a conveyer belt extending around the third transverse shaft and one of the pair of transverse shafts, means coöperating with the conveyer belt to grip the tassels, a rotary cutter upon the third transverse shaft for severing the stalks close to the boots, coöperating stripping rolls arranged in the path of the booted ends of the tassels for stripping the boots therefrom, a guide member, a second conveyer belt passing around the guide member and one of the pair of transverse shafts, the said second conveyer receiving the corn tassels from the first conveyer, means coöperating with the second conveyer to grip the ends of the tassels from which the boots have been stripped, and gearing between the stripping rolls and one of the transverse shafts, and means for driving the said transverse shaft.

In testimony whereof I hereunto affix my signature in the presence of two witnesses.

BENJAMIN TITUS.

Witnesses:
CHARLES TITUS,
AMELIA TITUS.